Sept. 28, 1926.  C. T. PATTERSON  1,601,703
PROCESS AND APPARATUS FOR SUPPLYING HEAT TO MOLTEN MATERIAL
Filed March 6, 1925    2 Sheets-Sheet 1
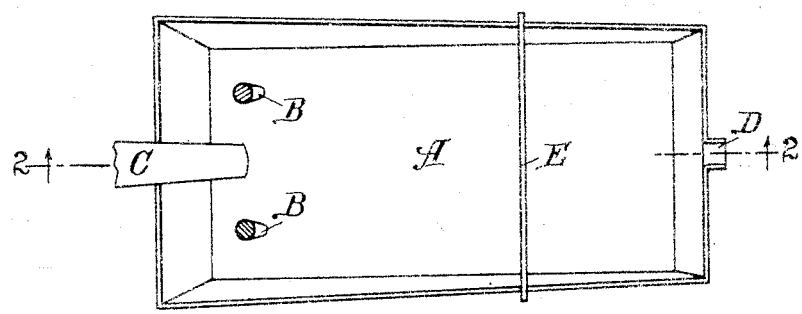
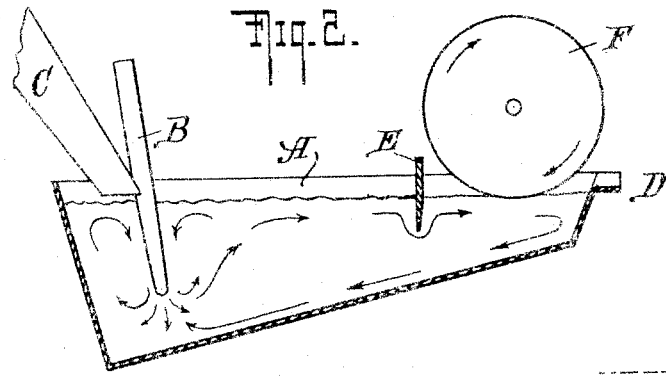
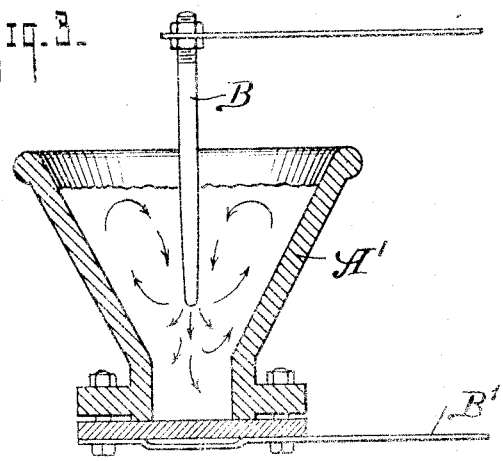
WITNESS
INVENTOR
CLARENCE T. PATTERSON
BY
ATTORNEYS

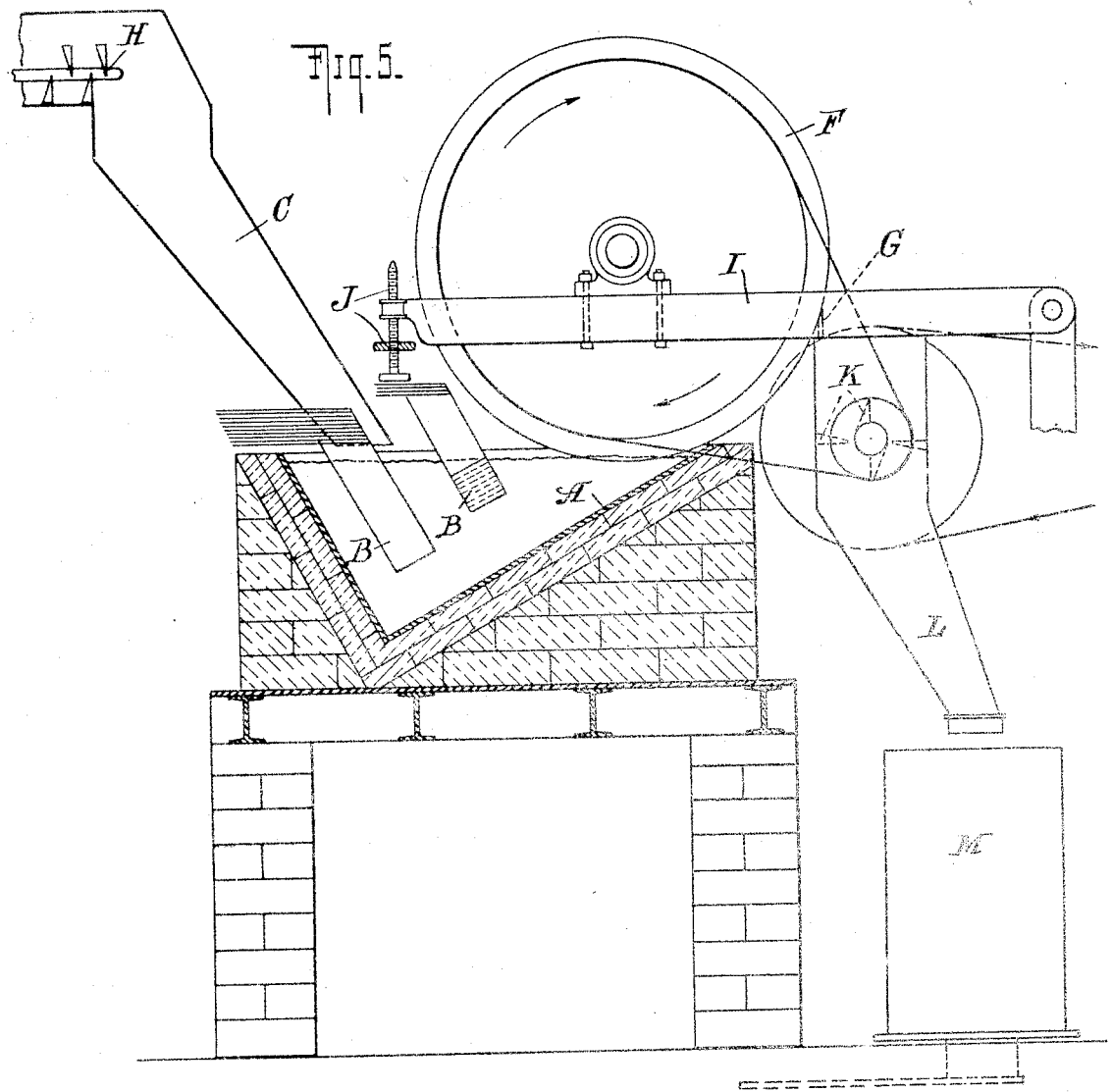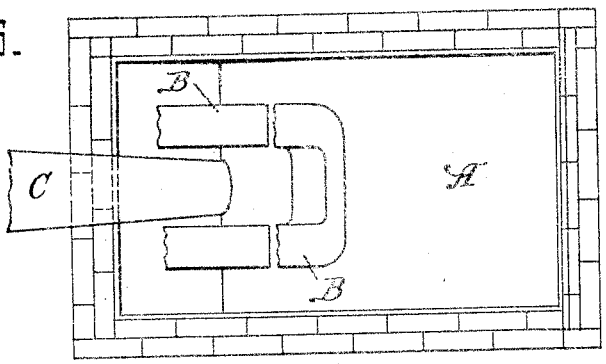

Patented Sept. 28, 1926.

1,601,703

UNITED STATES PATENT OFFICE.

CLARENCE T. PATTERSON, OF SYRACUSE, NEW YORK, ASSIGNOR TO THE SOLVAY PROCESS COMPANY, OF SOLVAY, NEW YORK, A CORPORATION OF NEW YORK.

PROCESS AND APPARATUS FOR SUPPLYING HEAT TO MOLTEN MATERIAL.

Application filed March 6, 1925. Serial No. 13,648.

My invention relates to electric resistance furnaces in which the material to be heated forms the resistance element and particularly to furnaces of this type for materials such as metallic salts whose heat capacity and heat conductivity are relatively poor compared with that of metals and metallic substances. In apparatus designed for this purpose considerable difficulty has been experienced in bringing to a uniform state of fusion or maintaining at the uniform desired temperature the entire amount of material contained within the furnace. The heat becomes localized in the immediate vicinity of the electrodes so that only a small portion of the material will be acted upon, and this portion may be heated too intensely leading to vaporization, in some cases, or such intense local heating may cause the electrodes of the furnace to become destroyed. A possible solution of this difficulty is either to decrease the furnace dimensions or to enlarge and shape the electrodes so as to produce a uniform current flow throughout the entire material to be treated. Such a solution is not practical because of the relatively large loss of heat from the system via the relatively large electrodes and furnace walls. The current consumption becomes uneconomical.

The object of my invention is to provide a process and apparatus of such character that the danger of local overheating will be avoided and yet the entire mass of material will be economically maintained at the proper temperature at all points. It has been found that a certain minimum relation between the current and the area of contact of the electrodes with the material, i. e., current density at the surface of contact between the electrodes and the molten material, will produce the proper heating action, this minimum current density depending on the nature of the particular material under treatment. When this relation is satisfied, movements are set up in the fusion mass such that all the required heat can be supplied without local over-heating and this heat distributed so that a relatively uniform and the desired temperature is maintained throughout the entire mass. While the current density should not fall below a certain figure, depending on the nature of such material, it must not exceed a certain upper limit, since otherwise dangerous and destructive local heating effects may result. In carrying out this invention the shape of the electrodes is of importance, as well as the preservation of a proper relation between the current and the area of contact of the electrodes with the fused material.

In the accompanying drawings, I have illustrated in diagrammatic fashion two types of apparatus suitable for carrying out the present invention. Fig. 1 is a plan view of one of such form of apparatus, Fig. 2 is a vertical section on line 2—2 of Fig. 1, Fig. 3 is a vertical section of a second form of furnace embodying this invention, and Fig. 4 illustrates upon an enlarged scale an electrode suitable for use in the improved furnace. Fig. 5 is a partly diagrammatic and partly sectional view of a commercial furnace and its associated equipment. Fig. 6 is a plan view of the furnace part of Fig. 5.

The particular apparatus which has been selected for the purpose of illustrating the invention and which is shown in the drawings, is of a character particularly adapted for the continuous production of fused soda ash or soda ash-sodium hydroxid mixtures. A is the furnace body, which may be made of steel boiler plate insulated on the outside. A 60 cycle alternating current feeds the electrodes B which are of opposite polarity, and preferably made of steel and so designed and positioned in the furnace that (in the particular case mentioned) a current density of about 90 amperes per square inch at their surface of contact with the material will produce the required heat. The solid material to be treated is introduced continuously at C and the fused product in equivalent amount is withdrawn at the overflow D, see Figs. 1 and 2. The electrodes B are preferably of circular cross-section and of a diameter decreasing gradually toward their free or lower ends, as will be understood by the example shown in Fig. 4. This configuration imparts a gentle taper to the free end of the electrodes, said taper as shown in Figs. 2, 3 and 4, extending through the major portion of the heating length of the electrodes. An electrode of this shape has a fairly uniform current density throughout its entire contact area.

The operation of the furnace may be started by introducing into the furnace a small amount of the material in a fused state, or this small amount of fused material necessary to provide the required conductor between the electrodes may be produced in situ. This can be done by bringing the electrodes close together and in contact with some of the material moistened with a little water, or by striking an arc momentarily between the electrodes B. As the fusion progresses, the distance between the electrodes is gradually increased until regular normal operating conditions are reached. The drawing does not indicate any particular means for moving the eelctrodes toward or from each other but any suitable arrangement may be adopted for this purpose; for instance, the electrodes may be pivoted to swing about parallel, horizontal axes, or they may be mounted in holders sliding horizontally toward or from each other. When electrodes of proper size and shape are employed and when the current conditions are properly adjusted in accordance with the nature of the material under treatment, the molten material will be kept in sufficiently active circulation by the action of the current, that a proper heat distribution is effected throughout the entire mass of the fused material, and thus a large bath can be maintained in a fused condition and at a uniform temperature, without any local overheating and without any local cooling such as would leave some portions of the material solid.

The circulating liquid can be used as a source of heat, for example, for the fusion of further quantities of solid material and this is the preferred procedure used in the production of fused soda ash or soda ash-sodium hydroxid mixtures, the solid material being more or less continuously introduced through the chute C into a body of fused material maintained in a continuous state of fusion and circulation in the furnace A.

The shape of the furnace proper A is of no particular account and any desired shape may be given to the container or furnace body.

It will be understood, as has been pointed out above, that the minimum current density required depends on the fluidity, viscosity, and other characteristics of the fused material and will be different for different materials. If, for example, the substance under treatment is sodium carbonate or sodium carbonate with an admixture of sodium hydroxid up to 30%, satisfactory results are obtained with a current density of from 50 to 100 amperes, and preferably about 90 amperes, per square inch at the surface of contact of the electrodes with the fused material.

The present invention provides a very convenient and economical procedure and means for maintaining relatively large masses of salts or compounds of similarly poor heat capacity and heat conductivity in a fused condition and at a uniform temperature throughout the mass. Moreover, with the present invention, such materials may be fused on a large scale and in a continuous manner with a comparatively small consumption of current.

In Figs. 1 and 2, I have also indicated a skimmer rod E located at the surface of the molten material between the electrodes and the outlet D. This skimmer, which is not an essential part of the apparatus but in many cases of considerable utility, will prevent unfused material from reaching the overflow or outlet D. When employing three-phase current, this skimmer E may form one of the three electrodes, the other two being formed by the rods B. The fused product, when withdrawn, may be cast into molds or otherwise disposed of. In certain cases, when it is desired to make a flake product, the material would not be discharged through the overflow D, but might be lifted out of the bath by means of a rotary drum such as indicated at F in Fig. 2, said drum dipping into the bath and picking up continuously a thin layer of molten material which solidifies as it travels towards the upper part of the drum. Any suitable means such as a scraper or equivalent device (see G Fig. 5) may be employed for removing the flaky material from such drum.

The apparatus may be varied considerably without departing from the nature of my invention. Fig. 3, for instance, illustrates a funnel-shaped or downwardly contracted container body A', which constitutes one of the electrodes of the circuit B, B', the other electrode B dipping centrally into the molten mass in substantially the same manner as described and illustrated with reference to Figs. 1, 2, and 4.

It will be noted that the contact between the electrodes and the molten bath is not simply along a limited surface at the very end of the electrode, but that such contact is all around the periphery of the curved surface of the electrode dipping into the liquid. This is of material importance in avoiding a current density so high as to cause injurious and destructive local effects both upon the electrodes and upon the material under treatment.

In Figs. 5 and 6 the electrodes B are illustrated as arranged somewhat differently from the arrangement of electrodes in Figs. 1 to 3. In Figs. 5 and 6 one of these electrodes is developed as a curved member whose curved portion is immersed in the bath of fused material, while the other two electrodes dip into the bath in the form of two separated fingers. In Fig. 5 there are also indicated feeding means H for causing travel of solid material into the chute C, means I—J for giving the drum F any desired regulatable degree of surface immersion and means K—L—M for moving and collecting the solidified flaky material scraped from the drum F.

This present invention, it will be observed, requires a certain amount of heat to maintain fusion in the substances under treatment, but also a proper distribution of this heat through the various parts of the fused mass, said mass being of relatively poor capacity and heat conductivity. The proper distribution of heat is brought about not by enlarging the electrodes, but rather by restricting the size of the electrodes thus apparently operating in the direction of greater local heat concentration and contrary to the principle of better heat distribution. At the same time it has been found, with respect to fused materials of the character in question, that by intensifying the current density by restricting the size of the electrodes, movement will be set up in the fused material to an extent sufficient to cause a proper distribution of heat throughout the entire fused mass taken as a whole and that the fact of this movement as a distributor of heat is sufficient to counterbalance the apparently excessive temperature at the electrodes. In other words, where larger electrodes are used the differences between the temperature at the electrodes and other parts of the fused mass are less great but they continue to exist as differences and even build up in degree, whereas when smaller electrodes are used, although the difference in temperature at different parts of the mass may be greater than where large electrodes are used, the movement generated in the fused mass is sufficient to bring all parts of it to more or less the same temperature, continuously thereby avoiding any building up of persisting temperature differences in different parts of the mass of fused material when considered as a whole. The invention can be readily applied to materials of various kinds by determining the amount of heat required and then, by reducing one or more of the electrodes in size until sufficient heat distributive motion is set up in the fused mass to establish a circulation adequate for the distribution of this heat. As exemplified by the third electrode E of Figs. 1 and 2 and the electrode B' of Fig. 3 it is not necessary for the practice of my invention that the current density at the contact surface of each and all the electrodes should be thus modified.

I claim:

1. In the process of supplying heat to a body of molten material by passing an electric current through the molten mass, that improvement which consists in proportioning the contact area of an electrode and the current so as to supply the required heat while distributing the heat throughout the mass by movements set up therein and governed by the relation between the contact area of the electrode and the current.

2. In the process of supplying heat to a body of molten material by passing an electric current through the molten mass, that improvement which consists in proportioning the contact area of an electrode and the current so as to supply the required heat and at the same time to distribute the heat sufficiently throughout the mass to maintain the entire mass in a continuing condition of fusion, said heat distribution being the result of movement set up in the mass sufficiently active to accomplish the said end, said movement being caused by the initial proportioning of the contact area of the electrode and the current.

3. The process which comprises establishing a bath of fused material of poor heat conductivity, maintaining said bath in continuous fusion throughout by passing an electric current therethrough by way of electrodes proportioned with reference to contact area and the current passing therethrough to effect by means of the resultant circulating motion in the bath a uniform temperature distribution throughout the bath.

4. The process which comprises establishing a bath of fused material of poor heat conductivity, maintaining said bath in continuous fusion throughout by passing an electric current therethrough by way of electrodes proportioned with reference to contact area and the current passing therethrough to effect by means of the resultant circulating motion in the bath a uniform temperature distribution throughout the bath, continuously adding to said bath and fusing in said bath, while maintained in the stated condition, additions of solid material of such character as, when fused by and in said bath, will become a part of said bath and effecting withdrawals from said bath, thus augmented, as the fused material increases, in volume by the fusion of the added solid material.

5. The process which consists in having the end surface and the peripheral surface of an electrode dip into a mass of fused material, and applying through said electrode a current of a strength sufficient to maintain fusion of the entire mass, and, by proportioning the contact area of the electrode and the current, bringing about heat distribution throughout the mass by causing the current to set up motion in the mass sufficient to maintain the whole of the mass in a condition of continuous fluidity throughout.

6. In the process of supplying heat to a body of molten material by passing an electric current through the molten mass, that improvement which consists in establishing such relation between the contact area of the electrode and the current as to supply the required heat and at the same time to maintain a continued condition of fluidity throughout the mass as the result of movement set up therein by the flow of current therethrough.

7. In the process of supplying heat to a body of molten material by passing an electric current through the molten mass, that improvement which consists in causing the current in addition to supplying the required heat to distribute said heat throughout the mass by movement sufficient to maintain substantially uniform temperature throughout the mass.

8. An electric furnace comprising a container for the electrolyte, having an inlet for the raw material and an outlet for the product, and depending electrodes of downwardly-tapering form in said container, said taper extending throughout the major portion of the heating length of the electrode.

9. An electric furnace comprising a container for the electrolyte, a depending electrode of downwardly-tapering form in said container, the taper of said electrode extending throughout a major portion of the heating length thereof, and a co-operating electrode.

10. An electric furnace comprising a container for the electrolyte and electrodes of substantial contact area, means for passing through the electrolyte a current of sufficient strength to maintain a fused condition in the electrolyte, the contact area of the electrode being relatively so small as to keep the fused mass in motion sufficiently to cause heat distribution throughout the mass, while relatively so large as to avoid detrimental over-heating of the electrodes or portions of the electrolyte adjacent thereto.

11. An electric furnace comprising a container for the electrolyte, having an inlet for the raw material and an outlet for the product, electrodes located between said inlet and said outlet adapted, by reason of their restricted size, to maintain a condition of continuous fluidity in the fused material as the result of motion set up in said material by the current flowing through said electrodes of restricted size, and a skimmer located between said electrodes and said outlet.

12. An electric furnace comprising a container for the electrolyte, having an inlet for the raw material and an outlet for the product, electrodes in said container adapted, by reason of their restricted size, to maintain a condition of continuous fluidity in the fused material as the result of motion set up in said material by the current flowing through said electrodes of restricted size, and a skimmer located in the container toward the outlet thereof.

13. An electric furnace comprising a container for the electrolyte, having an inlet for the raw material and an outlet for the product, electrodes in said container adapted, by reason of their restricted size, to maintain a condition of continuous fluidity in the fused material as the result of motion set up in said material by the current flowing through said electrodes of restricted size, and a rotary drum for lifting the fused electrolyte from the container.

14. An electric furnace comprising a container for the electrolyte, having an inlet for the raw material and an outlet for the product, electrodes in said container adapted, by reason of their restricted size, to maintain a condition of continuous fluidity in the fused material as the result of motion set up in said material by the current flowing through said electrodes of restricted size, and a skimmer located in the container toward the outlet thereof, and a rotary drum located between said skimmer and the outlet, to lift fused electrolyte from the container.

15. An electric furnace comprising a container for the electrolyte, having an inlet for the raw material and an outlet for the product, electrodes in said container adapted, by reason of their restricted size, to maintain a condition of continuous fluidity in the fused material as the result of motion set up in said material by the current flowing through said electrodes of restricted size, and a rotary drum located between said electrodes and the outlet to lift the fused electrolyte from the container.

In testimony whereof I have hereunto set my hand.

CLARENCE T. PATTERSON.